United States Patent [19]

Rauchwerger

[11] Patent Number: 4,574,994
[45] Date of Patent: Mar. 11, 1986

[54] HIGH SPEED DESOLDERING TOOL

[76] Inventor: George P. Rauchwerger, 147 Cromart Ct., Sunnyvale, Calif. 94087

[21] Appl. No.: 495,046

[22] Filed: May 16, 1983

[51] Int. Cl.[4] .............................................. B23K 3/00
[52] U.S. Cl. ...................................................... 228/20
[58] Field of Search ..................... 228/19, 20; 219/230

[56] References Cited

U.S. PATENT DOCUMENTS

| 2,955,187 | 10/1960 | Campo | 228/20 |
| 3,549,078 | 12/1970 | Fortune | 228/20 |
| 4,206,864 | 6/1980 | Rauchwerger | 228/20 |
| 4,289,953 | 9/1981 | Scheu, Jr. | 219/230 |
| 4,318,504 | 3/1982 | Rauchwerger | 228/20 |
| 4,358,662 | 11/1982 | Cranor et al. | 219/230 |
| 4,435,636 | 3/1984 | Royston | 228/20 |

FOREIGN PATENT DOCUMENTS 2079660  1/1982  United Kingdom .................. 228/19

Primary Examiner—Kenneth J. Ramsey
Assistant Examiner—Kurt Rowan
Attorney, Agent, or Firm—Julian Caplan

[57] ABSTRACT

A desoldering tool has a detachable solder collection tube interposed between the hollow tip of the tool and a source of vacuum. The tube is detached for removal of solder pellets. Within the tube is a filter preventing contaminants from being drawn into the vacuum pump. Within the tip is a cylindrical bore. Rotatable in the bore is a twisted stainless steel ribbon which allows solder to pass, but scrapes and cleans the bore.

9 Claims, 4 Drawing Figures

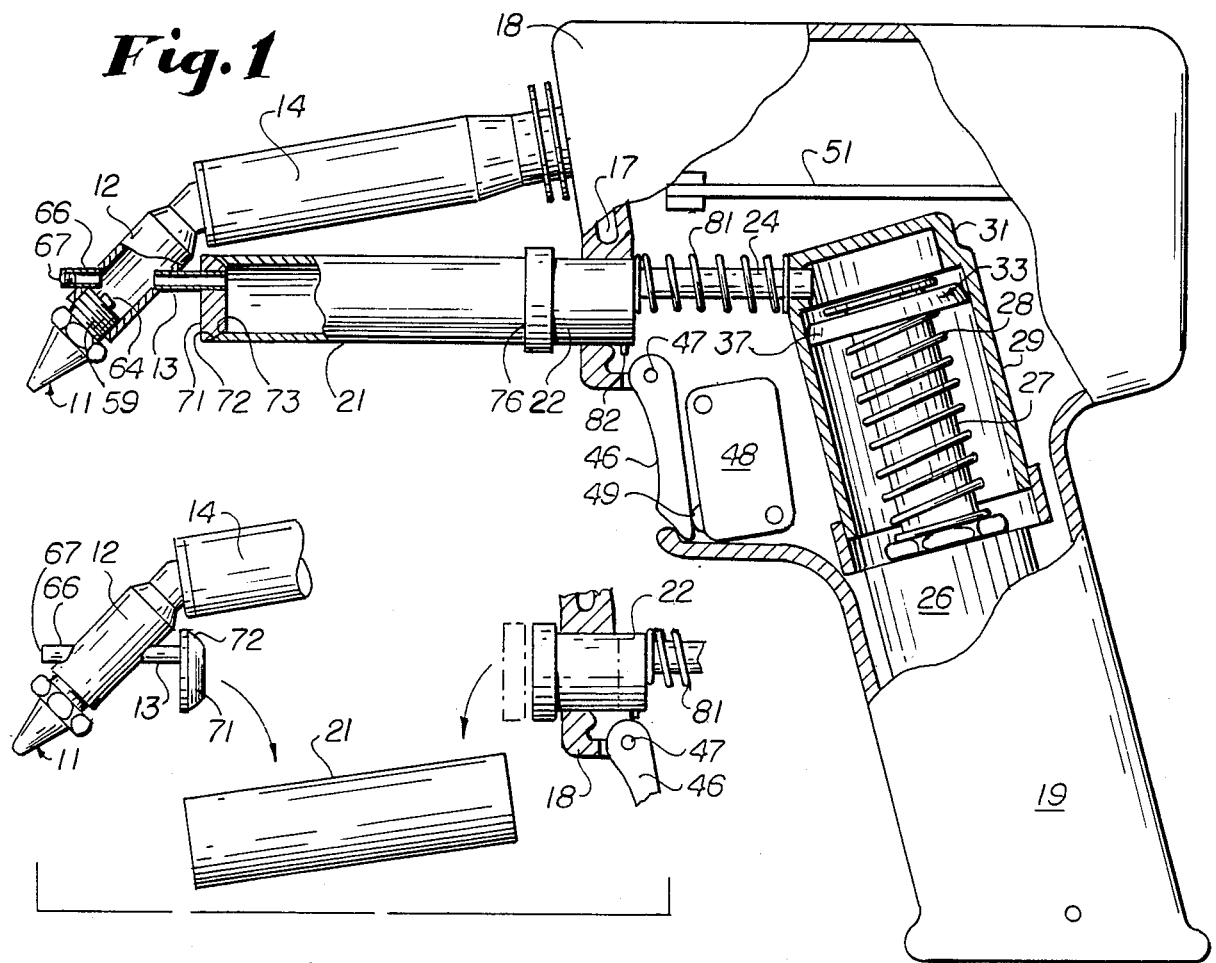
Fig. 1
Fig. 2
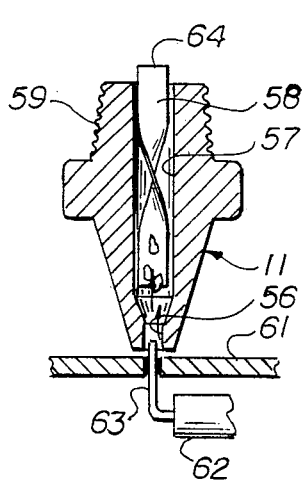
Fig. 4
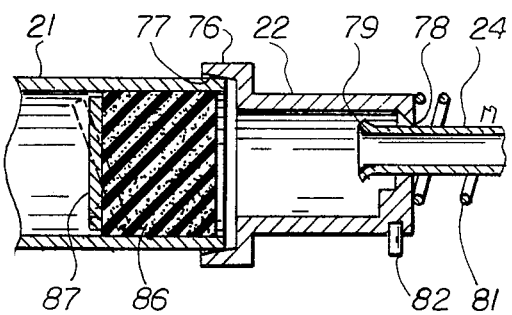
Fig. 3

HIGH SPEED DESOLDERING TOOL

This invention relates to a new and improved high speed desoldering tool. Reference is made to prior U.S. Pat. Nos. 4,318,504 and 4,206,864 on which the present invention is an improvement.

A principal feature of the present invention is the provision of a release for the solder collector tube whereby the tube may be disconnected from the assembly and solder pellets removed.

A second feature of the present invention is the provision of a disposable filter in the solder collector tube which prevents solder from being sucked into the vacuum plunger. The filter comprises a foam plastic or rubber cylinder having a disc of thin neoprene rubber on its forward end. Solder drawn into the tool contacts the disc, thereby preventing damage to the foam behind the disc. The foam is flexible enough so that the contaminated air flows past the disc and through the filter which removes solder fumes, fluxes, oxidants and whatever dirt is carried in, thereby preventing contamination of the working parts of the vacuum pump. The improved filter enables the tube to be used for longer periods of time between cleanings.

Since the solder collector cylinder is removable, the solder pellets collected therein may be removed conveniently and the filter changed when required. On the other hand, the connections at either end of the solder collector tube are such that an airtight passageway is provided and the vacuum efficiency of the device is maintained. The rear seal for the solder collector is spring-loaded, applying pressure to the collector tube and to the front seal, thereby insuring the good vacuum heretofore mentioned.

A positive vacuum seal is provided in accordance with the present invention without the use of O-rings or rubber washers.

Still another feature of the invention is the provision of a self-cleaning tip. Within the tip is a helix of stainless steel. When suction occurs the helix turns, allowing solder to pass through the helix without collecting at the bottom of the tip. Rotation of the helix prevents solder oxides from forming on the inner walls of the tip and thus makes the tip substantially self-cleaning.

The shape of the tip is such that a lead wire of a component soldered to a circuit board may enter the tip and clean the lower end thereof.

Furthermore, if the tip becomes clogged, the operator may remove the tip and, holding it with a wrench, turn the protruding upper end of the helix with a pair of pliers to scrape away any obstruction within the tip.

The present invention also incorporates many of the features and advantages set forth in said prior U.S. Pat. Nos. 4,318,504 and 4,206,864 and these advantages are not repeated herein, although present in the construction hereinafter described in detail.

Other objects of the present invention will become apparent upon reading the following specification and referring to the accompanying drawings in which similar characters of reference represent corresponding parts in each of the several views.

In the drawings:

FIG. 1 is a side elevational view of a tool in accordance with the present invention partially broken away to reveal internal construction;

FIG. 2 is an exploded elevational view showing removal of the solder collector tube;

FIG. 3 is an enlarged fragmentary sectional view through a portion of the structure of FIG. 1;

FIG. 4 is an enlarged sectional view through the tip showing how the lead wire of a component of a circuit board assists in cleaning the tip.

A number of the components of the present device are similar in structure and function to those of U.S. Pat. No. 4,318,504 and the same reference numerals are used to designate corresponding parts. Thus, the present invention may be used on the bench or in the field to remove solder from a joint such as on a printed circuit board 61 (hereinafter described). The device is hand-held, and, for convenience, is preferably generally similar to the shape of a pistol. At the distal end of the tool is a hollow conical tip 11, hereinafter described in detail, disposed generally at about a 45° angle to the normal holding position of the tool, an angle which is most convenient for removing solder from the work which may be either flat on the bench or tilted 45° from the horizontal. Tip 11 is threaded into tip holder 12 and leading from the tip holder 12 is a suction tube 13 which is short, of small diameter and preferably of a material to which molten solder does not adhere such as stainless steel. Beryllium copper plated with electroless nickel is a suitable material for tip 11 and holder 12 for long life. The upper end of tip holder 12 is fixed to heater element 14 and the proximal end of heater element 14 is fitted into the forward end of the tool casing 18 by means of a nose piece 17, or other convenient means. Casing 18 is hollow and generally of a pistol shape having a conveniently shaped handle 19.

Inward of suction tube 13 is a large diameter, thin-walled solder collector tube 21 of stainless steel or other suitable material. Between the proximal end of tube 21 and casing 18 is a connecting rear seal 22. Communicating with the upper end of rear seal 22 is a nylon tube duct 24 through which a vacuum is drawn from the tip 11, suction tube 13, collector tube 21 and rear seal 22.

Located in handle 19 is a solenoid 26 having a plunger 27 biased away from the solenoid 26 by return spring 28. Smooth bore cylinder 29 having a head 31 extends beyond solendoid 26. Piston 33, which is described in detail in U.S. Pat. No. 4,318,504, is fixed to plunger 27. Duct 24 connects with head 31.

On the front of handle 19 and extending through an aperture therein is a trigger 46, pivotted at its upper end by pivot 47 to casing 18. Inside trigger 46 is a snap action switch 48 which has a switch actuator 49 contacted by trigger 46 when it is squeezed inwardly, thereby closing the switch 48. The electrical wiring of the tool includes a printed circuit board 51 received in the upper end of housing 18.

A number of significant improvements in the construction of the tool will next be described.

Directing attention now to structure of the tip 11, the exterior thereof tapers inwardly-downwardly and the outer end is formed with a hole 56 which communicates with a cylindrical larger diameter bore 57 in which rotates a twisted, flat helical piece of spring stainless steel 58. Helix 57 is slightly longer than the bore 56 so that the upper end 64 thereof extends out through the proximal end of tip 11. When suction occurs, the helix turns allowing solder to pass by it without collecting at the bottom of the tip. However, if it is necessary from time to time to clean the tip, the tip 11 may be removed and the operator may turn the exposed ends 64 of the helix with pliers, or other tool, thereby scraping any obstruction from the interior of the tip.

In order to clean the tip holder 12, a clean-out tube 66 which may generally be in alignment with the suction tube 13 is normally closed off with a set screw 67. By removing the set screw 67, a cleaning implement may be inserted through the tube 66 and into the tip holder 12.

As shown in FIG. 4, a typical use for the tool of the present invention is in removing solder holding component 62 to a circuit board 61. Component 62 has a lead 63 secured to board 61 by solder. The end of the lead penetrates the hole 56, assisting in cleaning it.

Directing attention now to features of the collector tube 21, fixed to the right-hand end of the suction tube 13 (as viewed in FIGS. 1 and 2) is a forward or distal steel 71 having a spherical surface which seals against the chamfer 72 in the forward end of tube 21.

Rear seal 22 is an injected molded part made of a durable plastic such as Dupont Hytrell. It has an enlarged collar 76 formed with a taper 77 into which the proximal end of tube 21 seats. Spring 81 surrounding duct 24 bears against the rear seal 22, biasing it toward the left as viewed in FIGS. 1–3 and holding the tube 21 in place. By gripping the rear seal 22 and forcing it toward the right against the action of spring 81 (i.e., moving it from the operative or dot-and-dash line position of FIG. 2 to the solid line position) the tube 21 is released from the collar 76 and may be removed for cleaning and replacement of the filter. The proximal end of rear seal 22 is formed with a reduced diameter portion 78 which engages the exterior of the duct 24. An outward flare 79 of tube 24 prevents the duct 24 from falling out of place.

Within the proximal end of collector tube 21 is filter 86 of sponge plastic, or other suitable material. The distal face of the filter 86 has affixed thereto a disc 87 of thin neoprene rubber. Solder pellets drawn into the collector tube 21 by vacuum may contact the disc 87, thereby preventing damage to the filter 86.

Filter 86 allows air to pass through by flexing whenever a vacuum pulse is generated by solenoid 26. The contaminated air goes around the disc 87 and through the filter 86 which removes solder fumes, fluxes, oxidants and whatever dirt is carried in. Thus filter 86 protects the inner working parts of the vacuum pump. The disc 87 bonded to the foam filter 86 becomes a "crash" plate for the incoming solder. Since the solder is usually in the form of a spray, it solidifies and falls down to the walls of the cylinder 21 and thus does not stick to the filter.

Directing attention to FIG. 3, the flexing action of the disc 87 is shown. When the vacuum stops, the filter 86 acts as a spring, forcing the disc 87 forward to a position perpendicular to the axis of cylinder 21. Thus, an airpath is always open until such time as the collector cylinder 21 is full of solder.

What is claimed is:

1. In a desoldering tool of the type having a casing, a hollow tip supported by said casing, heating means for heating said tip, and vacuum drawing means in said casing, the improvement which comprises a solder collector tube having a distal and a proximal end, a distal seal for the distal end of said collector tube, a suction tube intercommunicating between the hollow in said tip and said distal seal, a rear seal having means at its forward end to seal against the proximal end of said collector tube, a duct connected to said vacuum drawing means in slidable and sealing engagement with said rear seal and resilient means biasing said rear seal to seal against said collector tube and thereby biasing said collector tube to seal against said distal seal, whereby upon moving said rear seal away from said collector tube against the force of said resilient means the collector tube may be removed from said tool to clean out solder, a hollow holder for said tip, a clean-out tube for said holder and a cap for said clean-out tube.

2. The improvement of claim 1 which further comprises a deformable sponge plastic filter inside the distal end of said collector tube capable of deforming when vacuum is drawn by said vacuum drawing means.

3. The improvement of claim 2 which further comprises a disc of heat impervious material on the distal end of said filter.

4. The improvement of claim 1 in which said suction tube is approximately on the opposite side of said holder from said clean-out tube and in alignment therewith.

5. In a desoldering tool of the type having a casing, a hollow tip supported by said casing, heating means for heating said tip, and vacuum drawings means in said casing, the improvement which comprises a solder collector tube having a distal and a proximal end, a distal seal for the distal end of said collector tube, a suction tube intercommunicating between the hollow in said tip and said distal seal, said suction tube extending through and being fixed to said distal seal, said distal seal bearing against said distal end and being detachable therefrom, a rear seal having means at its forward end to bear against the proximal end of said collector tube, and thereby form a seal with said proximal end, a duct connected to said vacuum drawing means in slidable and sealing engagement with said rear seal and resilient means biasing said rear seal to bear against and thereby seal against said collector tube and thereby biasing said collector tube to seal against said distal seal, whereby upon sliding said rear seal along said duct away from said collector tube against the force of said resilient means the collector tube may be removed from said tool to clean out solder by removing said collector tube from both said rear seal and said distal seal, said tip having a cylindrical bore, a small diameter hole below said bore and a twisted ribbon of metal rotatable within said bore.

6. The improvement of claim 5 in which the upper end of said ribbon protrudes above the upper end of said tip.

7. In a desoldering tool of the type having a casing, a hollow tip supported by said casing, a hollow holder for said tip, heating means for heating said tip, vacuum drawing means in said casing, a solder collector tube, a suction tube between said holder and said collector tube, means connecting said collector tube to said vacuum drawing means, the improvement comprising said tube being formed with a cylindrical bore and a small diameter hole below said bore and a twisted ribbon of metal within said bore.

8. The improvement of claim 7 in which the upper end of said ribbon protrudes above the upper end of said tip.

9. The improvement of claim 7 in which said ribbon is a flat piece of stainless steel.

* * * * *